United States Patent [19]

Kita et al.

[11] Patent Number: 5,526,562
[45] Date of Patent: Jun. 18, 1996

[54] WIRING HARNESS ASSEMBLY LINE

[75] Inventors: Youichi Kita; Toyoshi Murai, both of Kanazawa, Japan

[73] Assignee: Sumitomo Wiring Systems, Ltd., Japan

[21] Appl. No.: 218,218

[22] Filed: Mar. 25, 1994

[30] Foreign Application Priority Data

Mar. 29, 1993 [JP] Japan .................................. 5-095414

[51] Int. Cl.⁶ .................................................. B21F 23/00
[52] U.S. Cl. ........................ 29/755; 140/92.1; 198/486.1
[58] Field of Search ............................. 140/92.1, 93 R; 29/755, 794, 868; 198/486.1

[56] References Cited

U.S. PATENT DOCUMENTS

| | | | |
|---|---|---|---|
| 1,994,646 | 3/1935 | Heath | 198/486.1 |
| 3,454,148 | 7/1969 | Harrison | 198/486.1 |
| 3,913,202 | 10/1975 | Pyle et al. | 29/203 MW |
| 4,030,527 | 6/1977 | Roch | 140/92.1 |
| 4,265,178 | 5/1981 | Veith | 104/88 |
| 4,316,535 | 2/1982 | Brems et al. | 198/473 |
| 4,653,159 | 3/1987 | Henderson et al. | 140/93 R |
| 4,677,734 | 7/1987 | Bloch et al. | 29/564.2 |
| 4,858,311 | 8/1989 | Koch | 29/868 |
| 4,936,223 | 6/1990 | Billings et al. | 104/102 |
| 5,082,253 | 1/1992 | Suzuki et al. | 269/45 |

FOREIGN PATENT DOCUMENTS

| | | | |
|---|---|---|---|
| 260331 | 3/1988 | European Pat. Off. | A41H 43/02 |
| 562189 | 9/1993 | European Pat. Off. | H01B 13/00 |

*Primary Examiner*—Lowell A. Larson
*Attorney, Agent, or Firm*—Jordan B. Bierman; Bierman and Muserlian

[57] ABSTRACT

There is disclosed a wiring harness assembly line wherein a member supply line (2) including a looped track (20) and hangers (30) movably suspended from the track (20) is provided on the outer periphery of a plate supply line (1) so that the hangers (30) pass through a work space of an operator at an assembly position, whereby the member supply line is adapted to replenish a plate for wiring with members such as sub-assemblies.

11 Claims, 6 Drawing Sheets

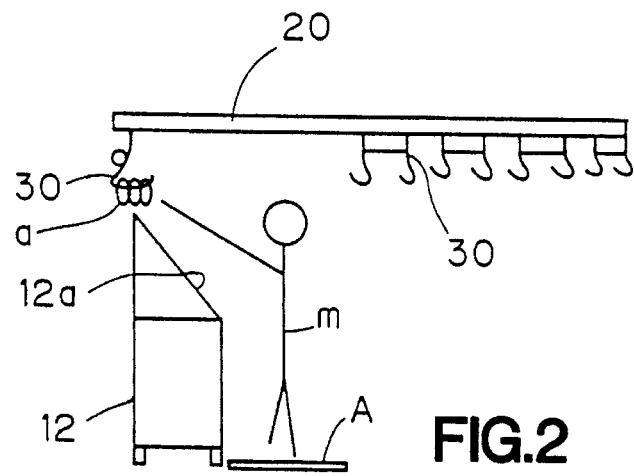
FIG.2
FIG.3A
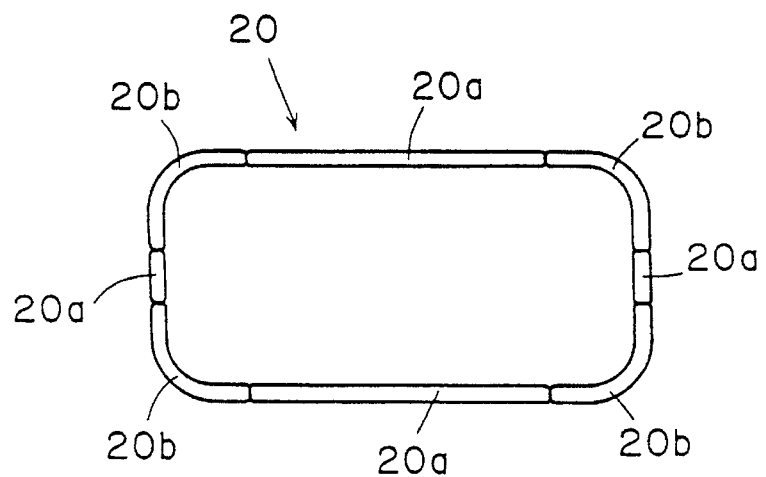
FIG.3B
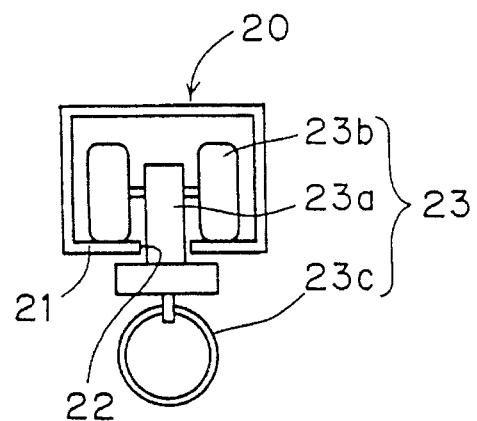

WIRING HARNESS ASSEMBLY LINE

BACKGROUND OF THE INVENTION

1. Field of the Invention

The present invention relates to an assembly line for wiring harnesses for use in automotive vehicles.

2. Description of the Prior Art

In general, a wiring harness assembly line comprises a plate supply line for sequentially feeding plates for wiring harness assembly to a work space of an operator. An operator assembles a plurality of sub-assemblies (hereinafter referred to as sub-assies) fed separately to the work space into a wiring harness on each of the plates.

The sub-assies are a component of the wiring harness and each includes joined wires 51 threaded through a tube 52 and having terminals connected to connectors 53 to be arranged into a configuration which facilitates main junction, as shown in FIG. 7. Such sub-assies are used to assemble the wiring harness for the purpose of efficiency of the wiring harness assembly by performing some of the required operations in the process step of fabrication of the sub-assies.

A member chuting system indicated by the reference character X in FIG. 9 has been adopted for supplying members such as the sub-assies.

The member chuting system is commonly adopted at the present time. Specifically, a so-called member chute 60 including a plurality of piled-up resin containers 61 housing the members such as the sub-assies is located behind a work space A provided along the plate supply line 70, and an operator takes a member out of the resin containers 61 if required, as shown in FIG. 9.

However, this system necessitates the operator necessarily looking back to take out the member, resulting in the operator suffering from bodily troubles such as pains in the back and low operating efficiency. Further, the member chute 60 and backup stock members located behind the work space A create a disorderly appearance in the whole works and cause a safety problem such that one may stumble over them and fall.

SUMMARY OF THE INVENTION

According to the present invention, a wiring harness assembly line comprises: a plate for wiring harness assembly disposed in corresponding relation to a work space of an operator, and a member supply line for feeding a member required to assemble a wiring harness to the work space, the member supply line including a track passing through the work space, and a member holder mounted on the track for movement along the track.

Preferably, the plate includes a plurality of plates for wiring, and the wiring harness assembly line further comprises a plate supply line: for sequentially feeding to the work space the plurality of plates arranged in a loop, the member supply line extending outwardly from the outer periphery of the plate supply line in the work space.

In the wiring harness assembly line as above constructed, the operator in the work space takes a required member out of the member holder in the work space to assemble the wiring harness on the plate using the member. An assistant at a position spaced from the operator periodically replenishes the empty member holder with a member.

As above described, in the wiring harness assembly line according to the present invention, the member supply line having the track and the plurality of member holders movably mounted on the track is designed such that the member holders pass through the work space.

Preferably, the track passes at least above and ahead of the operator positioned in the work space.

The member replenishment is enabled without hindering the operation of the operator. In particular, the track adapted to pass at least above and ahead of the head of the operator in the work space permits the operator to take the members such as the sub-assies while he remains facing forward unlike the prior art. This improves the operator's operating efficiency and reduces the loads of the assistant for member replenishment, providing the totally improved productivity.

Preferably, the track is formed in a loop, the member holder includes a plurality of member holders, and the plurality of member holders are coupled to each other to form a plurality of groups of member holders.

The track of looped configuration and the member holders coupled to each other into the plurality of groups of member holders permit the operator to efficiently handle the plurality of types of members. In addition, only by moving the unrequired member holder toward one side, a member holder with replenished member is automatically fed from the other side, providing improved operating efficiency. The assistant replenishes the member holders with the members for each group.

Preferably, the member supply line includes drive means for moving the member holder along the track.

The member holders are moved-by the drive means, providing further improved operating efficiency.

An object of the present invention is to improve the chuting system of the prior art to provide a wiring harness assembly line of high operating efficiency.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a side view showing relation between a member supply line and an operator of the preferred embodiment;

FIGS. 3A and 3B are detail views of a track of the preferred embodiment;

DESCRIPTION OF THE PREFERRED EMBODIMENTS

Figure 1:
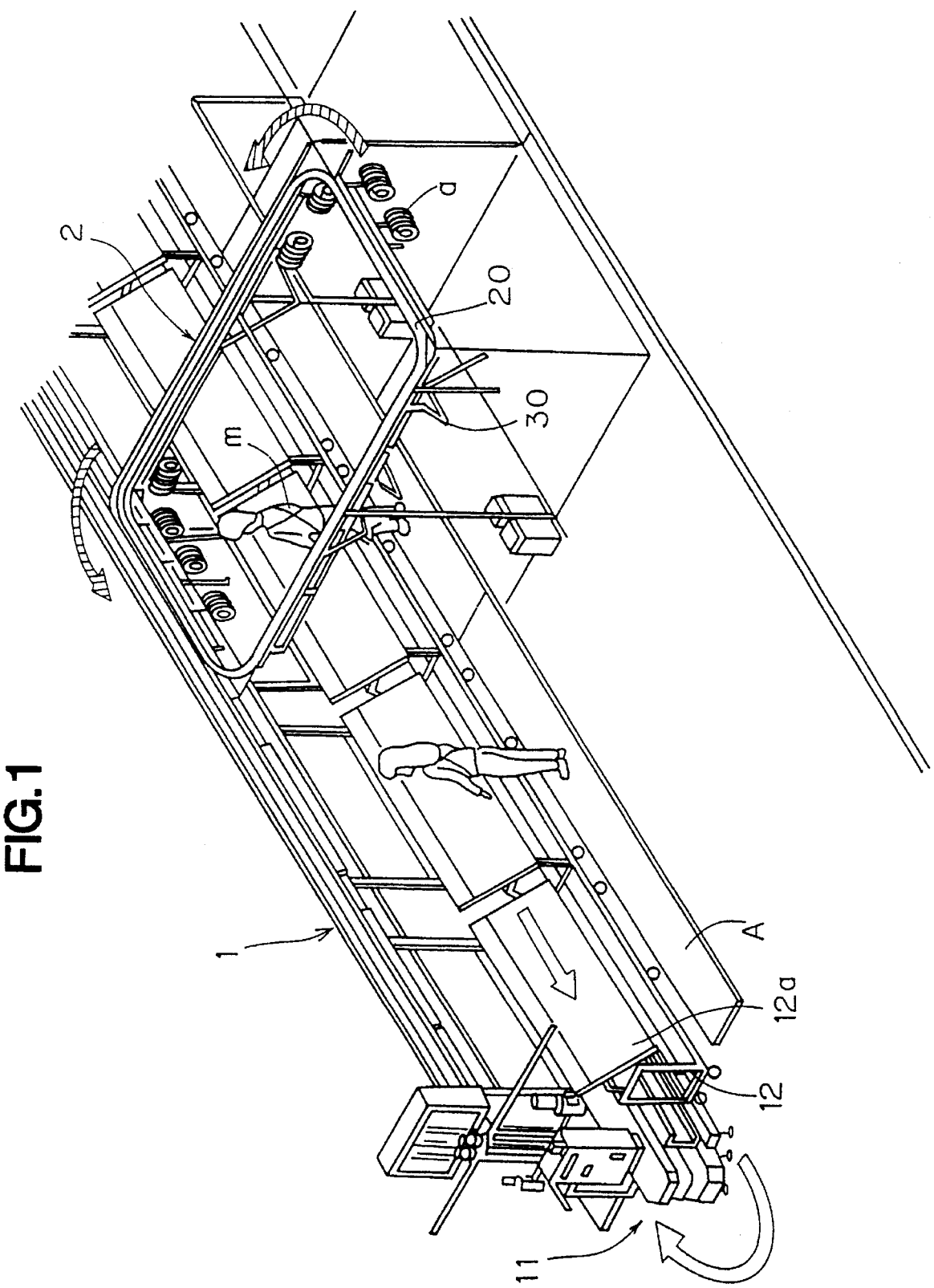
FIG. 1 is a perspective view of a preferred embodiment according to the present invention.

Referring to the drawings, a preferred embodiment will now be described according to the present invention. As shown in FIG. 1, a wiring harness assembly line comprises a plate supply line 1 for feeding plates for wiring harness assembly to a work space, and a member supply line 2 for feeding members required to assemble wiring harnesses to the work space.

The plate supply line 1 includes a body frame 11, plate carriages 12 movably supported by the body frame 11, and drive means (not shown) for the plate carriages 12.

The body frame 11 is long enough to permit a multiplicity of plate carriages 12 to be arranged in series therealong as shown in FIG. 1. The plate carriages 12 are adapted to endlessly circularly travel around the outer periphery of the body frame 11 by the drive means in such a manner as to move in one direction on one side of the body frame 11 and move in the reverse direction on the other side thereof.

A plate 12a for wiring harness assembly is mounted on each of the plate carriages 12 and is downwardly inclined toward the outside so that an operator m standing in a work space A outside the travel path of the plate carriages 12 can assemble the wiring harnesses without difficulty.

In the plate supply line 1 as above constructed, wiring harness components, for example, known as the foregoing sub-assies which are members for wiring harness assembly are supplied to each work space by the member supply line 2. The operator m joins the supplied sub-assies together on the plate 12a, tapes the joined sub-assies and attaches such parts as protectors to the joined sub-assies, to complete a wiring harness.

As shown in FIG. 1, the member supply line 2 includes an annular track 20 and hangers 30 suspended from the track 20 and is provided to extend outwardly from the outer periphery of the plate supply line 1.

The track 20 is designed such that the hangers 30 pass above and ahead of the operator m standing in the work space, that is, through the work range of the operator above the plate 12a, as shown in FIGS. 1 and 2.

Referring to FIGS. 3A and 3B, the track 20 includes linear portions 20a and corner portions 20b alternately joined to each other into an annular configuration, each of the linear and corner portions 20a and 20b being formed of a tubular member of rectangular cross-sectional configuration having a lower surface plate 21 with a slit 22 in the middle. The track 20 further includes runners 23 for suspending the hangers 30 from the track 20 for movement along the track 20.

Each of the runners 23 includes a support shaft 23a threaded through the slit 22 of the tubular member, rotating rollers 23b rolling on an inner surface of the lower surface plate 21, and a ring 23c attached to the bottom end of the support shaft 23a for suspending the hanger 30 therefrom, as shown in FIG. 3B. The runners 23 are adapted to freely travel along the track 20. The corner portions 20b of the track 20 has a radius of curvature which permits the runners 23 to travel smoothly.

Figure 4:
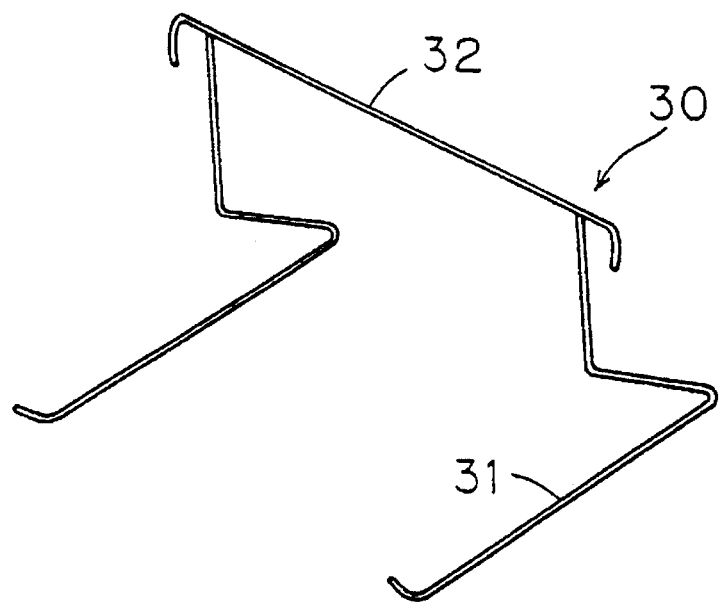
FIG. 4 is a perspective view of a hanger of the preferred embodiment.
Figure 5:
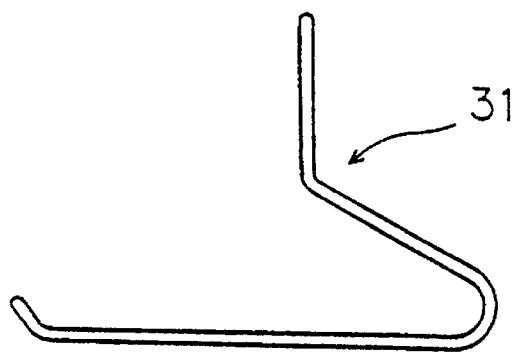
FIG. 5 is a side view of the hanger of the preferred embodiment.

Each hanger 30 includes a pair of suspension members 31 of the shape shown in FIG. 5, and a coupling member 32 having downwardly bent suspending portions at opposite ends for coupling the pair of suspension members 31 at their upper ends as shown in FIG. 4. The suspension members 31 and coupling member 32 are formed of round steel having a diameter of 6 mm.

Figure 6:
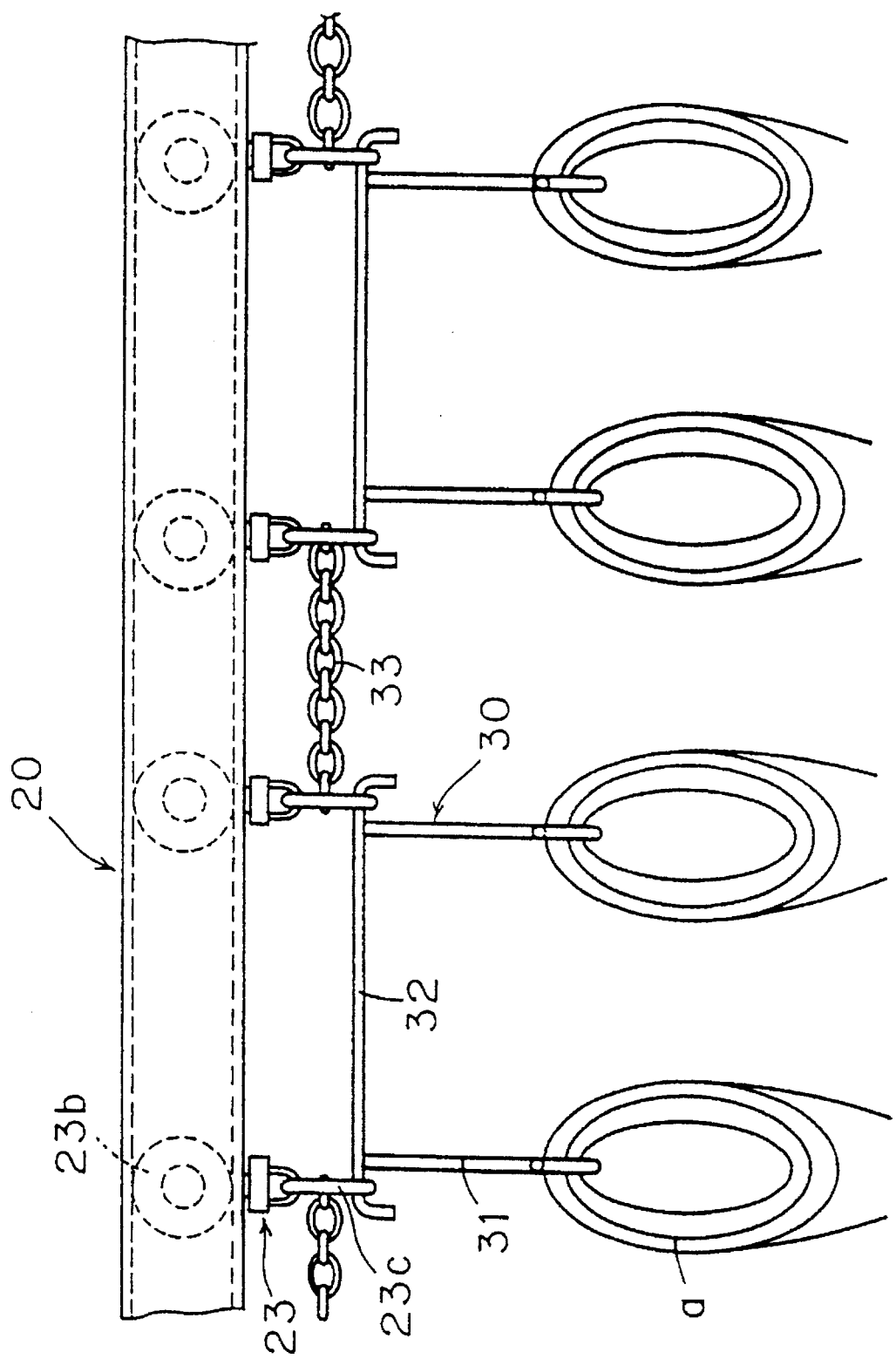
FIG. 6 is a side view showing the details of the member supply line of the preferred embodiment.
Figure 7:
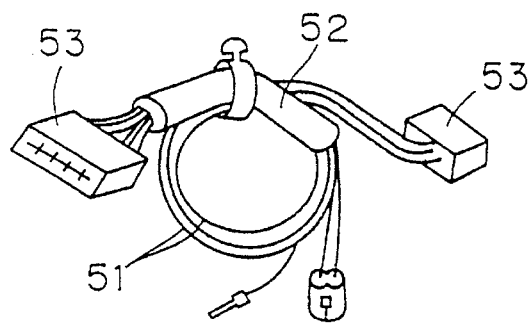
FIG. 7 is a perspective view of an example of sub-assies.

When the hangers 30 are suspended such that the coupling member 32 at opposite ends is hung on the suspending tings 23c of the runners 23 as shown in FIG. 6, the suspending rings 23c are held between the bent end portions of the coupling member 32 and the upper end portions of the suspension members 31, so that members a such as sub-assies may be suspended from each suspension member 31 without falling off.

The respective hangers 30 suspended from the track 20 are coupled to each other at the suspending rings 23c through plastic chains 33 as shown in FIG. 6. The operator holding and moving the chains 33 along the track 20 enables all of the hangers 30 to simultaneously travel in the same direction. The plurality of hangers 30 are divided into the plurality of groups of some hangers.

Thus, when the operator m moves one of the groups of hangers 30 to a position above and ahead of the operator m to assemble a wiring harness, an assistant can replenish the other groups of hangers 30 with the members such as the sub-assies without hindering the operator m from assembling the wiring harness. This reduces stock components placed behind the line, completely achieving proper arrangement, cleaning and cleanliness.

The plurality of hangers 30 are divided into the groups in this manner not only because consideration is given to the use of the plurality of types of sub-assies by one operator for assembly of the wiring harness but also because one hanger is insufficient but the plurality of hangers should be combined if a large number of sub-assies are desired to be supplied at one time.

The hangers 30 in each group are preferably positioned to be arranged ahead of the operator m so that the operator m can takes the members in front of the operator m.

Figure 8A:
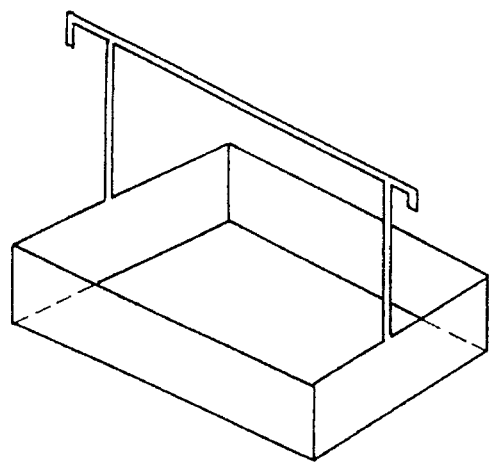
FIGS. 8A and 8B are perspective views of different types of holders.
Figure 8B:
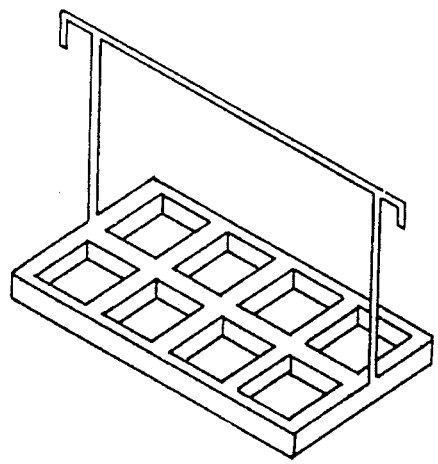
Figure 9:
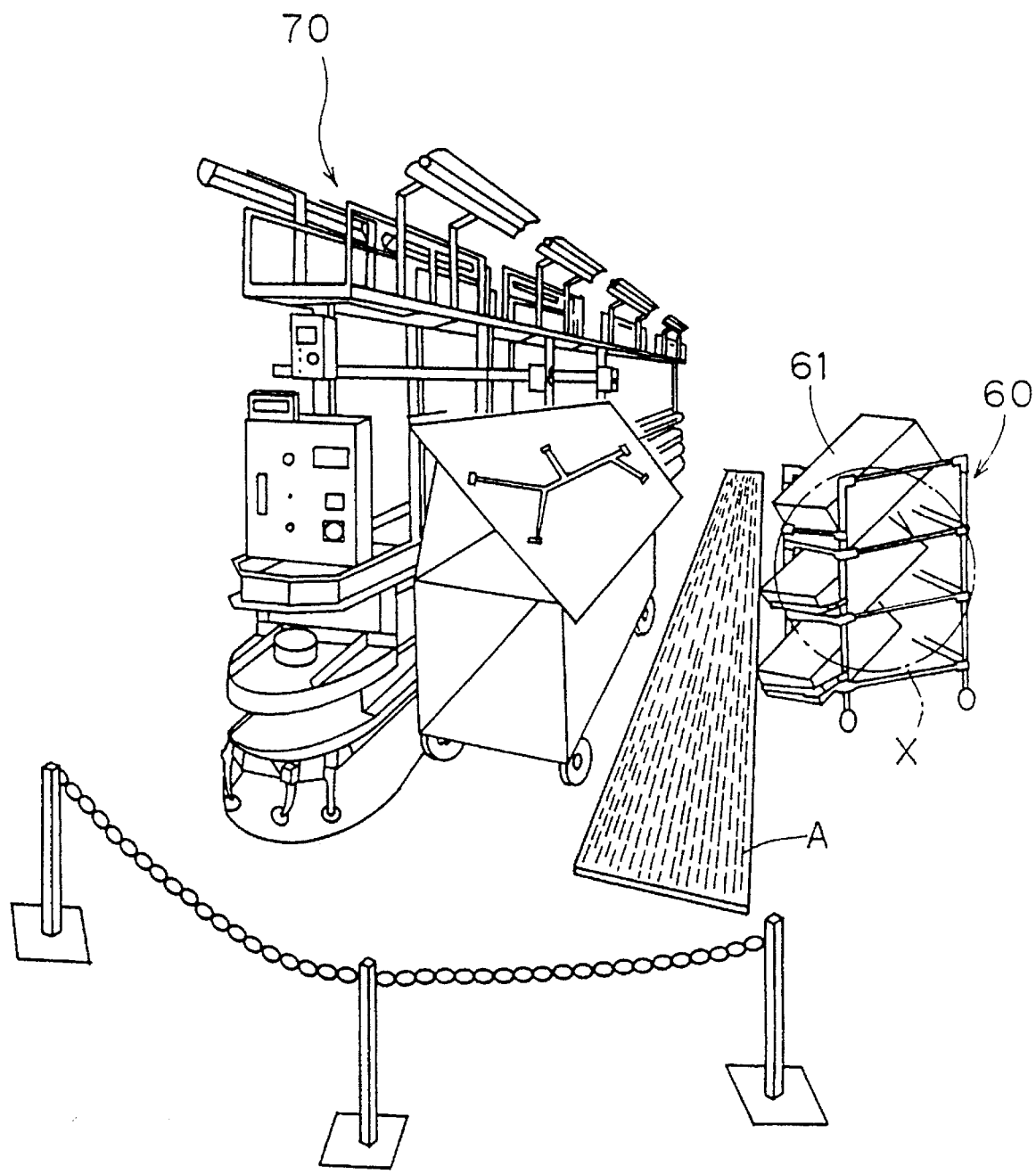
FIG. 9 is a perspective view of the prior art.

Although the foregoing hangers 30 are used for holding the sub-assies in this preferred embodiment, optimum holders of high operating efficiency should be appropriately selected in accordance with the configuration of the sub-assies. For example, holders such as a box as shown in FIGS. 8A and 8B may be movably provided on the track, and exterior parts such as protectors, corrugate tubes, grommets for use in mounting parts may be fed depending on the configuration of the holders.

Further, although the operator himself holds the chains 33 to move the groups of hangers 30 in this preferred embodiment, drive means such as a motor may be provided to automatically move the groups of hangers 30.

The present invention is not limited to the wiring harness assembly line of the preferred embodiment including the plate supply line 1 for feeding the plates to the work space, but the plates 12a may be previously fixed at a position corresponding to the work space.

While the invention has been shown and described in detail, the foregoing description is in all aspects illustrative and not restrictive. It is therefore understood that numerous modifications and variations can be devised without departing from the scope of the invention.

What is claimed is:

1. A wiring harness assembly line comprising at least one plate adapted to receive a plurality of members which constitute a wiring harness, said plate moving in a plate direction in a closed plate path past at least one operator, a supply line, carrying said members in a downstream direction along a track forming a closed supply path, said supply line extending between a supply station, where said members are placed on said track, to a discharge station, where said operator removes said members from said supply line for inclusion in said wire harness on said plate, said discharge station being between said operator and said plate path, a plurality of hangers on said supply line, each of said hangers carrying one of said plurality of elements, said hangers being coupled to each other to form a plurality of groups of said hangers.

2. The assembly line of claim 1 wherein said discharge station is above said operator.

3. The assembly line of claim 1 wherein said supply line comprises a driver to move said supply line in said downstream direction along said track.

4. The assembly line of claim 1 wherein said supply line comprises a plurality of rings, depending from carriages in said track, a plurality of hangers, each said hanger comprising a coupling rod linked to two successive said rings, at least one suspension element, attached to and depending from said coupling rod, said suspension element adapted to releasably retain at least one said member.

5. The assembly line of claim 4 wherein a first said coupling rod extends between a first upstream ring and an adjacent first downstream ring, a second coupling rod extends between a second upstream ring and an adjacent second downstream ring, said first downstream ring being spaced apart from said second upstream ring in said downstream direction, and linked thereto.

6. The assembly line of claim 4 wherein there are two suspension elements on each said coupling rod spaced apart in said downstream direction.

7. The assembly line of claim 21 wherein said suspension element comprises a vertical depending rod having a supporting portion adjacent its distal end, said supporting portion extending in a perpendicular direction to said downstream direction.

8. The assembly line of claim 6 wherein each of said suspension element comprises a vertical depending rod having a supporting portion adjacent its distal end, said supporting portion extending in a perpendicular direction to said downstream direction.

9. The assembly line of claim 6 wherein a receiving unit is suspended from two adjacent said suspension elements, said unit adapted to receive at least one of said members.

10. The assembly line of claim 18 wherein said unit is a basket.

11. The assembly line of claim 18 wherein said unit is an open grating.

* * * * *